United States Patent
Stivala et al.

(10) Patent No.: US 10,588,264 B2
(45) Date of Patent: Mar. 17, 2020

(54) STRIPPER DEVICE FOR A BALER

(71) Applicant: Deere & Company, Moline, IL (US)

(72) Inventors: Marc Stivala, Rioz (FR); Michel Menetrier, Beaujeu (FR)

(73) Assignee: DEERE & COMPANY, Moline, IL (US)

( * ) Notice: Subject to any disclaimer, the term of this patent is extended or adjusted under 35 U.S.C. 154(b) by 303 days.

(21) Appl. No.: 15/459,863

(22) Filed: Mar. 15, 2017

(65) Prior Publication Data

US 2017/0265399 A1    Sep. 21, 2017

(30) Foreign Application Priority Data

Mar. 17, 2016  (DE) .................. 10 2016 204 481

(51) Int. Cl.
| | | |
|---|---|---|
| *A01F 15/07* | (2006.01) | |
| *A01F 15/18* | (2006.01) | |
| *A01F 15/08* | (2006.01) | |

(52) U.S. Cl.
CPC .......... *A01F 15/07* (2013.01); *A01F 15/0833* (2013.01); *A01F 15/0883* (2013.01); *A01F 15/18* (2013.01); *A01F 2015/077* (2013.01)

(58) Field of Classification Search
CPC .. A01F 15/07; A01F 15/0705; A01F 15/0833; A01F 15/0883; A01F 15/18; A01F 2015/077; A01F 2015/078; A01F 2015/107; A01F 2015/183; A01F 2015/186
USPC ................................. 100/174, 112
See application file for complete search history.

(56) References Cited

U.S. PATENT DOCUMENTS

| | | | | |
|---|---|---|---|---|
| 4,155,298 | A | 5/1979 | Gaeddert et al. | |
| 4,768,645 | A * | 9/1988 | Farris ............... | B65G 45/00 198/499 |
| 5,191,833 | A * | 3/1993 | Clevenger, Jr. ..... | B30B 5/06 100/88 |
| 5,355,992 | A * | 10/1994 | Baig et al. ......... | B65G 45/22 198/495 |
| 5,913,805 | A * | 6/1999 | Vodon ................ | A01F 15/07 100/88 |

(Continued)

FOREIGN PATENT DOCUMENTS

| | | |
|---|---|---|
| DE | 69308059 T2 | 6/1997 |
| DE | 19851470 | 5/2000 |

(Continued)

OTHER PUBLICATIONS

John Deere, John Deere 900 Series Round Balers: A Look Inside, Feb. 11, 2015 https://www.youtube.com/watch?v=vYTcWhOmER4 1:00-1:34 (Year: 2015); 2 pages.*

(Continued)

*Primary Examiner* — Adam J Eiseman
*Assistant Examiner* — Matthew Kresse

(57) ABSTRACT

A stripper device, for reducing adhesions on a movable part of a baler including a pressing apparatus interacting with a bale, has a scraper bar carrier with a scraping bar, wherein the scraping bar carrier can be movably connected to the baler and has a first position, in which the scraping bar is operatively abutted against the pressing apparatus, and a second position, in which the scraping bar is withdrawn from the pressing apparatus, wherein the scraping bar assumes the second position cyclically.

6 Claims, 3 Drawing Sheets

(56) References Cited

U.S. PATENT DOCUMENTS

| | | | | |
|---|---|---|---|---|
| 6,860,378 B1 * | 3/2005 | Johannsen | ............. | B65G 45/00 |
| | | | | 198/497 |
| 8,348,406 B2 * | 1/2013 | Baumgardner et al. | ..................... | |
| | | | | B65G 45/18 |
| | | | | 198/496 |

FOREIGN PATENT DOCUMENTS

| | | | | | |
|---|---|---|---|---|---|
| DE | 69626865 | T2 | 2/2004 | | |
| DE | 10241215 | | 3/2004 | | |
| EP | 1264531 | | 12/2002 | | |
| EP | 1308078 | | 5/2003 | | |
| WO | WO 94/29203 | | * 12/1994 | ............. | B65G 45/16 |

OTHER PUBLICATIONS

European Search Report issued in counterpart application No. 17161372.2 dated Aug. 29, 2017. (8 pages).
German Search Report in foreign counterpart application No. 102016204481.8, dated Oct. 28, 2016 (8 pages).

* cited by examiner

STRIPPER DEVICE FOR A BALER

CROSS-REFERENCE TO RELATED APPLICATIONS

Pursuant to 35 USC § 119, this application claims the benefit of and priority to German patent application no. 102016204481.8, filed on Mar. 17, 2016, which is herein incorporated by reference in its entirety.

FIELD OF THE DISCLOSURE

The present disclosure relates to a stripper device for reducing adhesions on a pressing apparatus interacting with a bale in an agricultural round baler.

BACKGROUND

Known stripper devices are frequently used on balers having movable parts that come into contact with baling material to be processed in the baler. The stripper devices have scraping bars that cooperate with the movable parts of the baler in order to counteract adhesions of baling material and other material such as dirt, soil, baling material residues etc., or to remove already existing adhesions or deposits. The movable parts are frequently pressing means in the form of straps or belts. Stripper devices are also known to correspondingly interact with rollers or cylinders of a baler.

Such balers are used both in the agricultural field and in the industrial field. Corresponding agricultural balers are used, for example, to form crop bales, in the form of round bales for example, and frequently produce substantially cylindrical bales of crop in the form of straw, hay, chopped forage etc. Industrial balers are used for compacting trash, textiles or other materials and/or pressing them to form bales.

Stripper devices for pressing means in the form of straps or belts are known, having a scraping bar carrier that bears a scraping bar and is movably mounted on a baler. Such stripper devices often do not work optimally, particularly under difficult harvesting conditions such as wet crop.

SUMMARY

The problem addressed by the disclosure is considered that of specifying a stripper device, a baler and a method of the type mentioned above by which the above-mentioned disadvantages can be overcome.

This problem is solved by the teaching of one or more of the independent claims. Additional advantageous configurations and refinements of the disclosure are specified in the dependent claims.

A stripper device for reducing adhesions to a movable component of a baler, such as a pressing means interacting with the bale, has a scraping bar carrier bearing a scraping bar. The scraping bar carrier is movably connectable to the baler and can assume at least a first position, in which the scraping bar is operatively abutted against the pressing means, and a second position, in which the scraping bar is withdrawn from the pressing means. It is conceivable that the scraping bar carrier can be displaceable or movable in some other manner. In some embodiments, it is pivotably connectable to the baler. It is provided that the scraping bar assumes the withdrawn position cyclically. The regular withdrawal of the scraping bar from the pressing means, which takes place in a cycle, counteracts a buildup of scrapings on the scraping bar, because the scrapings can fall off or down from the scraping bar as well as the scraping bar carrier or the stripper device itself during withdrawing or while in the withdrawn state, and thus when the scraping bar is in the state remote from the pressing means. Congestion and/or malfunctions of the type that can occur due to accumulation and clumping of material, particularly during wet conditions and/or with damp baling or crop material, can be effectively counteracted in this manner. This is also aesthetically advantageous. The baler is designed in the form of an agricultural round baler. The stripper device can also be used in other balers, for example, on industrial balers. The applications are also not limited to use in round balers.

The pressing means is advantageously designed in the form of an endless pressing means, such as a pressing belt or strap and/or has at least one endless pressing means, such as a pressing belt or strap. There can also be a plurality of endless pressing means or, according to the one embodiment, two such endless pressing means. The pressing means can also be designed in the form of a roller or cylinder or in any other suitable manner, or can comprise these.

It is conceivable that the cycle can be determined by a control or regulating device of the baler. The cycle can be determined by an assembly or by an assembly of the baler that already follows a cyclical process. A separate control or regulation of the stripper device can be avoided in this manner, since the cycle or the sequence is already defined by this assembly, the function thereof or the control or regulation thereof. The cycle or operation of the stripper device can also be synchronized with one or more assemblies of the baler in this manner, without having to take elaborate measures for this purpose. The cycle can be determined by a tensioning mechanism of the baler, such as a tensioning mechanism for the pressing means.

The tensioning mechanism can have at least one tensioning arm, which can be connected directly or indirectly to the bale press so as to pivot or rotate and can interact with a tensioning element. During formation of the bale or after conclusion of the bale formation and/or during ejection of the bale, such tensioning arms can follow a substantially cylindrical movement process. If the tensioning arm is operatively connected to the scraping bar carrier, the scraping bar carrier can follow a movement of the tensioning arm at least in certain areas. In this manner, the cyclical movement process of the tensioning arm can be transmitted in a simple manner to the scraping bar carrier and/or at least partially synchronized or dependent pivoting can be implemented.

It can be advantageous if the scraping bar carrier is provided to be jointly pivotable with an articulated lever about an axle on the frame. The articulated lever can cooperate via a connecting means with the tensioning arm. If the connecting means has at least one connecting element and a spring means interacting therewith, then these elements can function as overload protection by allowing the scraping bar to pivot away if there is an overload due to a stone or a particularly large or hard adhesion of material, so that damage to the stripper device can be avoided. Such a mechanism can alternatively or additionally be used to ensure contact of the scraping bar or to hold and/or maintain a predetermined tension on the pressing means. The operation of the stripper device can be further improved in this manner.

It is conceivable to provide the scraping bar of a rigid material and/or integral with the scraping bar carrier. If the scraping bar is designed as a separate component, for example one that is detachably connectable to the scraping bar carrier, then it can be produced from a different material than that of the scraping bar carrier and/or can be exchanged in case of wear and/or damage, or can also be adapted to different harvesting conditions. Adjusting the position of the scraping bar relative to the scraping bar carrier is also possible in this manner. In some embodiments, the scraping bar is flexible, at least in certain areas, and can be designed in the form of a hard rubber strip or lip.

It is especially favorable if a tensioning mechanism is provided, among other things, to maintain a specifiable tension of the pressing means during opening of the baling chamber and/or ejection of the bale, and/or to absorb slippage that occurs. It is also conceivable that the tensioning mechanism applies tension to the pressing means during the bale formation or in some other manner.

If a baler is equipped with one or more of the previously described stripper devices, this can support the operation of the baler by precluding adhesions or deposits on one or more pressing means in an advantageous manner. The stripper device or one or more stripper devices can be arranged in an area of the baling chamber facing a drawbar. This arrangement can be favorable because the stripper device can be relatively well protected from external influences in this area. An arrangement in a different area, such as the rear area of the baler, is also conceivable. In some embodiments, the stripper device cooperates with an outer side of the pressing means, a side and/or surface facing away from the baling chamber or facing a frame of the baler in the embodiment shown. It is also conceivable for the stripper device to cooperate with the corresponding inner side of the pressing means, especially if the pressing means is designed as an endless pressing means, in the form of a pressing belt or strap for example, or comprises such a belt or strap. The baler can be an agricultural baler for forming cylindrical bales. The press can also be used in the industrial field, for example for forming bales of paper, trash, fabric or other materials. Use in a baler for forming cuboid or other bales is also possible.

According to a method for operating a baler of the type mentioned above, the stripper device can cooperate with the pressing means during the formation of the bale in the baling chamber in such a manner that deposits that have adhered, for example to the outer side of the pressing means, can be removed at least partially by the stripper device or the scraping bar from the pressing means or the outer side thereof. During opening of the baling chamber to eject a bale or during ejection of a bale, the stripper device does not (continue to) cooperate with the pressing means, or the scraping bar is brought into a position withdrawn or distant from the outer side of the pressing means, in such a manner that previously stripped-off deposits can fall off the stripper device or the scraping bar.

If the stripper device is operatively connected to a tensioning mechanism, which can provide an optionally specifiable tension of the pressing means and/or absorbs slippage possibly occurring while the baling chamber is being opened and/or a bale is being ejected from the baling chamber, the stripper device and/or one or more of the components thereof can follow the cyclical mode of operation of this tensioning mechanism in a simple manner. It is additionally conceivable that the tensioning device may have one/more alternative and/or additional functionalities.

BRIEF DESCRIPTION OF THE DRAWINGS

The disclosure, as well as further advantages and advantageous refinements of the disclosure and configurations of the disclosure, will be described in more detail and explained with reference to the drawings, which show an embodiment of the disclosure.

Therein.

DETAILED DESCRIPTION

Figure 1:
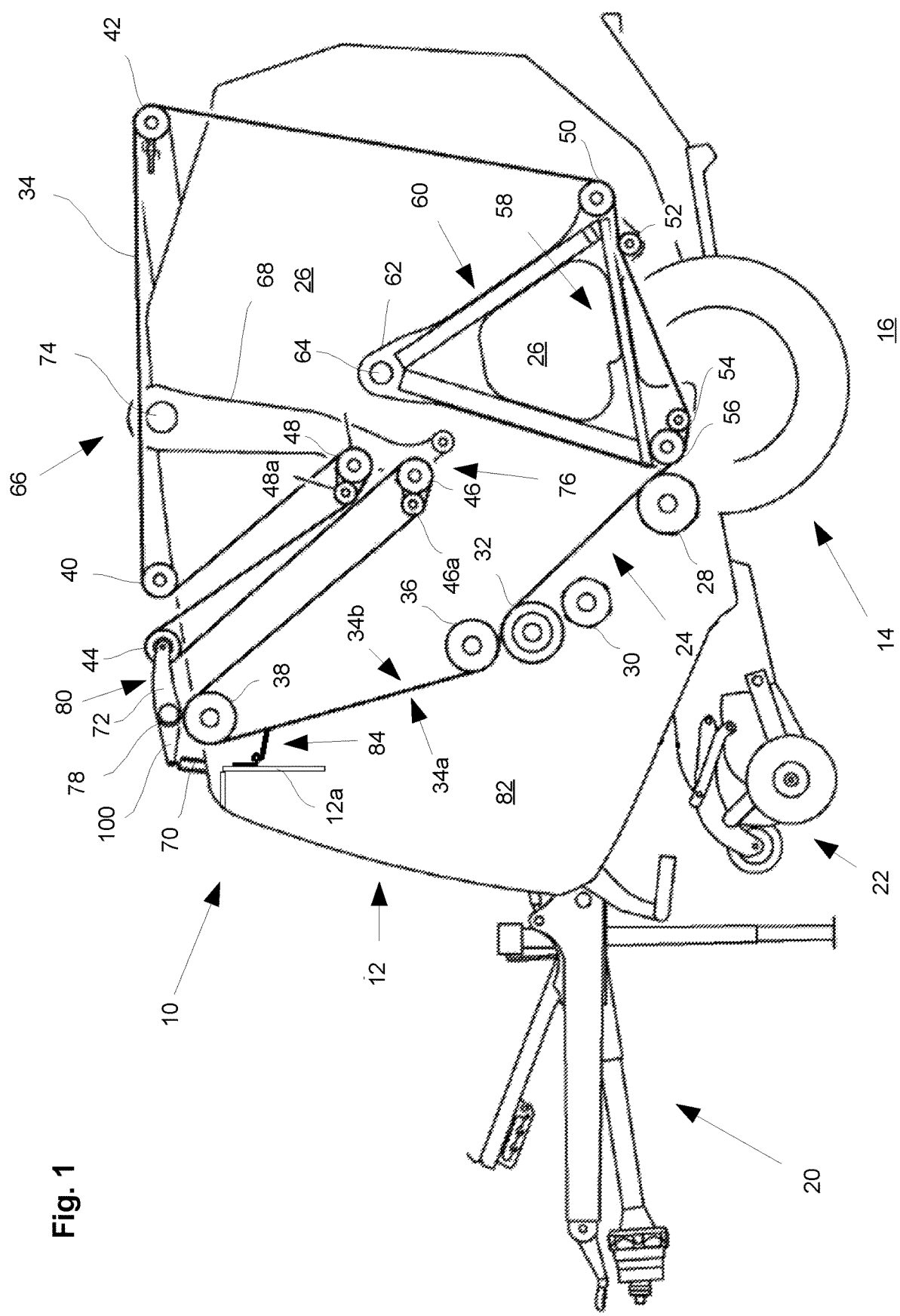
FIG. 1 shows a side view of a baler having a stripper device.

FIG. 1 shows an embodiment of a baler 10, having a frame 12 that is supported via a chassis 14 on the ground 16. The baler 10 shown is designed in the form of a round baler and can be used both in the agricultural field and in the industrial field for producing a cylindrical bale, typically referred to as a round bale, from crop material, but also from trash, paper, sheet material or fabric, cotton, tobacco etc. Such a baler 10 can be towed by a working vehicle, for example in the form of an agricultural tractor, not shown, or can be constructed to be self-propelled.

According to the embodiment shown, a drawbar 20 is provided on the front side of the frame 12 in order to be able to hitch the baler 10 to an agricultural tractor, not shown, and tow it across a field. A receiving device 22 in the form of a pickup is used for receiving crop lying on the ground 16, e.g. hay or straw deposited in a swath. The crop picked up by the receiving device 22 is fed to an inlet 24 of a baling chamber 26 and wound up there in a spiral shape to form a cylindrical bale, tied and subsequently deposited on the ground 16.

A lower stationary roller 28 and two upper stationary rollers 30, 32 are positioned at the inlet 24 of the baling chamber 26. The baling chamber 26 is additionally formed by an endless pressing means 34, which is designed in the present embodiment in the form of two adjacent pressing belts side by side and is guided about a plurality of stationary rollers 36, 38, 40, 42 and movable rollers 44, 46, 48, 50, 52, 54, 56. The pressing means 34 has an outer side 34a facing the frame 12 and an inner side 34b.

While the baling chamber 26 is surrounded peripherally substantially by the pressing means 34 and the rollers 28, 30 and 32, it is delimited laterally by side walls that are not shown.

Four rollers 50, 52, 54, 56 among the movable rollers 44-56 are mounted freely rotatably in a lower region 58 of a delta-shaped carrier 60, which is pivotably articulated at its upper vertex 62 about an axle 64 running transversely to the forward direction and can be brought by an actuator (not shown) from the bale-forming position shown in FIG. 1 into a bale ejection position, pivoted upward and to the rear.

A tensioning mechanism 66 for tightening the pressing means 34 has a tensioning lever 68 that cooperates with a first tensioning element, not shown, and a tensioning arm 72 that cooperates with a second tensioning element 70. Both the tensioning element that is not shown and the tensioning element 72 can be designed in a conventional manner as, and/or can comprise, a mechanical spring or a hydraulic motor.

The tensioning lever 68 is mounted in the region of the side walls, not shown, about an axle 74 running horizontally and transversely to the forward direction and bears, in an end region 76 facing away from the axle 74, two of the movable rollers 46, 48 and cleaning rollers 46a, 48a associated with these rollers 46, 48. The tensioning arm 72 is mounted correspondingly about an axle 78 and bears one of the movable rollers 44 in an end region 80. In addition, the tensioning arm 68 is operatively connected at one end to the tensioning element 70 and at the other end to the baler or the frame 12 thereof, in a manner not shown.

The pressing means 34 is pressed by the tensioning arm 72 sufficiently firmly against the rotationally driven stationary roller 38 that the pressing means is driven. The roller 36 is also driven rotationally. The pressing means 34 assumes an initial position, in which it spans, stretched in a straight line, the inlet 24, and a final position, in which it wraps around the bale like a large loop. The baling chamber 26 is therefore variable in size, i.e. its diameter increases with the size of the bale. The bale is located during formation thereof in the baling chamber 26 and is largely wrapped by the pressing means 34, but falls out of the baling chamber 26 to the rear onto the ground 16 as soon as the carrier 60 is pivoted upward by the movable rollers 50-56, counterclockwise as viewed in the drawing. Alternatively, the bale can also be deposited onto a device downstream of the baler 10 in the form of a device for wrapping the bale with a net or film of material.

The embodiment of the baler shown here is disclosed in detail in EP 1 308 078 A1. Other possible embodiments are described in DE 198 51 470 A1, DE 102 41 215 A1 and EP 1 264 531 A1. The disclosures of these documents are incorporated by reference into the present documents.

In a region 82 of the baler 10 that faces the drawbar 20, a stripper device 84 is provided in order to be able to scrape off or strip off deposits or adhesions on the pressing means 34 or the outer side 34a thereof, such as in the form of wet or moist crop such as grass, dirt or other material. The reader is now referred to FIGS. 2a and 2b, in which the stripper device 84 is shown in further detail. The stripper device 84 has a scraping bar carrier 86 and a scraping bar 88. The scraping bar carrier 86 is pivotably connected via a joint 90 to a frame region 12a of the baler 10 at one end, and at the other end bears the scraping bar 88, consisting, according to the present embodiment, of a flexible plastic material, which can be formed in the manner of a hard rubber strip or lip, for example.

The scraping bar carrier 86 is pivotably connected, together with an articulated lever 92, to a region 12a of the frame 12 via the joint 90. The articulated lever 92 is in turn connected via a connecting element 94 and a connecting means 98 having a spring means 96 to a tensioning arm lever 100, which is mounted pivotably with the tensioning arm 72 about the same axle 78 in such a manner that it can also pivot jointly with the tensioning arm.

Figure 2A:
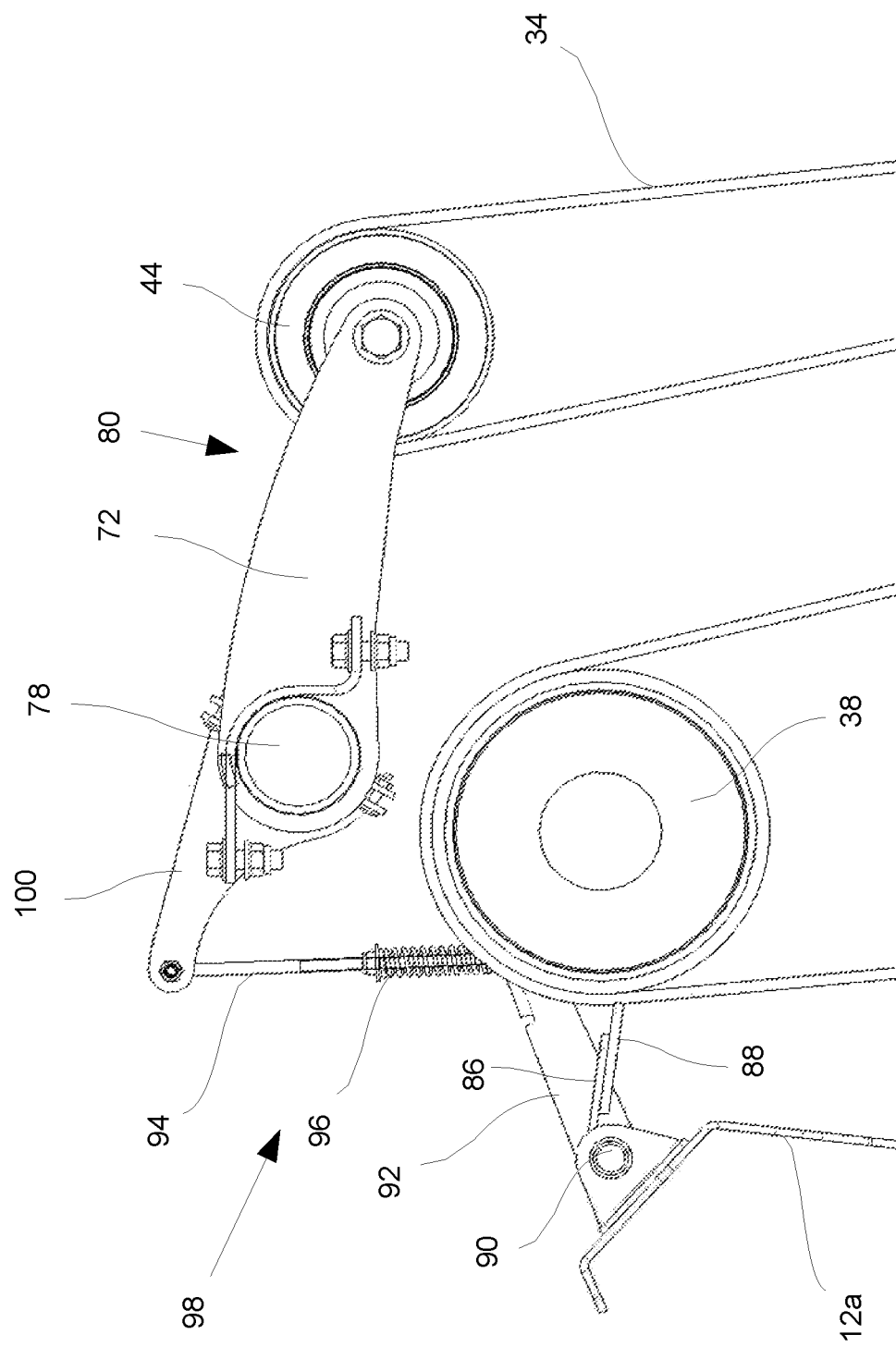
FIG. 2a shows an enlarged view of the stripper device of FIG. 1 in a first position.
Figure 2B:
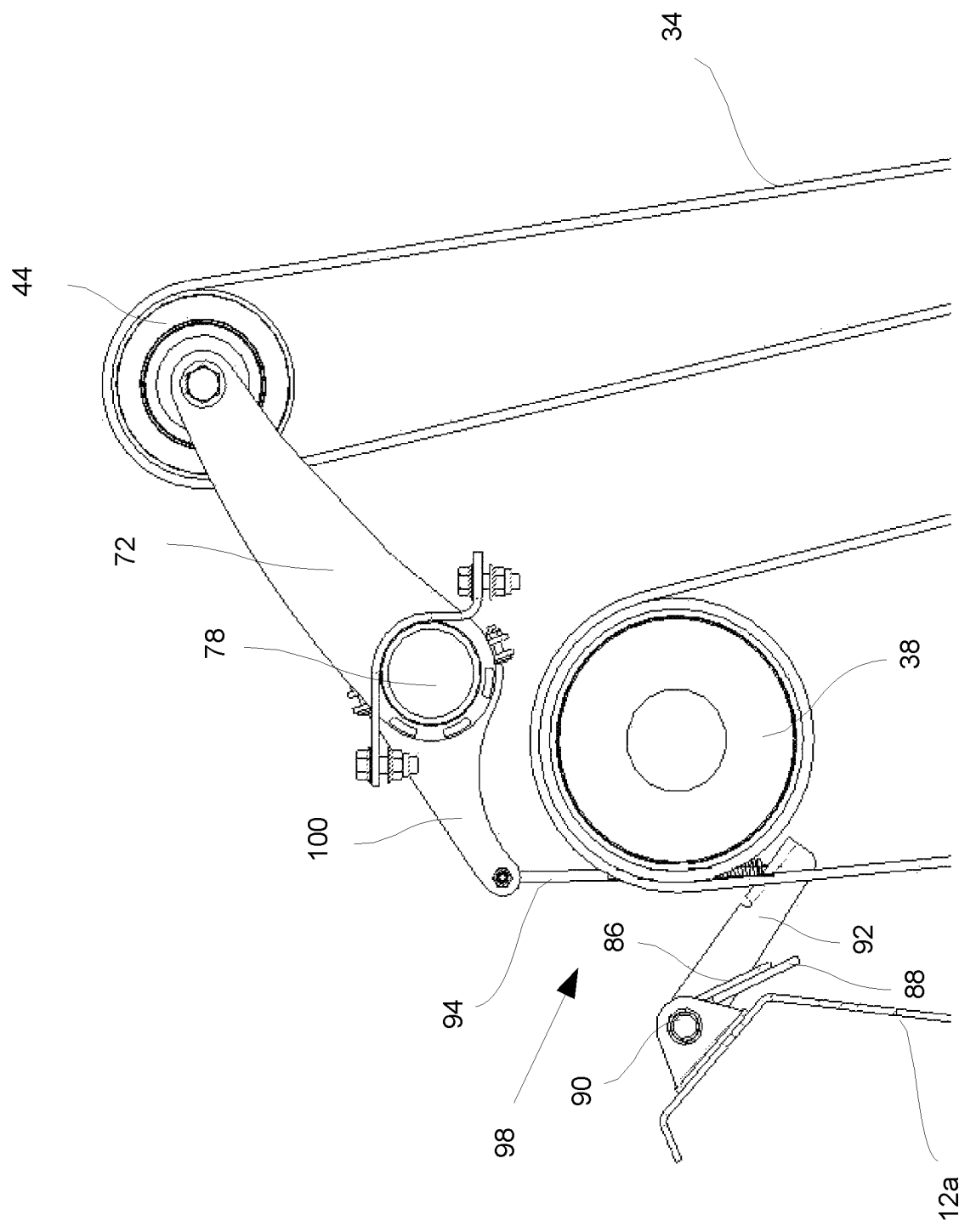
FIG. 2b shows an enlarged view of the stripper device of FIG. 1 in a second position.

The mode of operation of the stripper device 84 will be dealt with in detail below. Reference is made for this purpose to FIG. 1 and FIGS. 2a and 2b.

During the bale-forming process, the tensioning arm 72 assumes the position shown in FIG. 2a, pivoted downward and to the right relative to the baling chamber 12. After termination of the bale-forming process and a possible subsequent tying or wrapping with net or film material, a delta-shaped carrier 60 is pivoted backward and upward. The rollers 50 and 56 provided on the carrier 60 drive the pressing means 34 into exactly the same position, whereby the bale, previously surrounded in the baling chamber 26 by the pressing means 34, is discharged from the baling chamber 26 by the pressing means 34 and deposited on the ground 16 or on a connected device such as a device for wrapping the bale with a net or film material.

If the delta-shaped carrier 60, and thus the rollers 50, 56 mounted thereon and the pressing means 34, pivot backward and upward, then the tensioning lever 68 begins to move back in the direction of its lower position shown in FIG. 1.

The tension of the pressing means 34 is briefly maintained by an upward movement of the tensioning arm 72. Any slippage that may occur can thus be absorbed and/or prevented. The tensioning arm 72 pivots briefly upward about the axle 78, whereby the pivot arm lever 100 pivots downward. This downward-directed movement is transmitted via the connecting means 98 to the articulated lever 92, which brings the scraping bar carrier 86, and thus the scraping bar 88, downward, shown in FIG. 2b, into the withdrawn position or, in other words, into the position remote from the pressing means 34 or the outer area 34a of the pressing means 34. In this position, the deposited material that may have been removed by the stripper device 84, and collected on one of the scraping bar carrier 86 and/or the scraping bar 88, can fall downward. Then the tensioning arm 72 pivots back, due to the action of the tensioning means 70, into its position shown in FIG. 2a, in which it adjoins the outer region 34a of the pressing means 34. The spring means 96 can ensure in this position that the scraping bar 88 uniformly contacts the outer region 34a of the pressing means 34 and/or can allow escape of the scraping bar 88, the scraping bar carrier 86 and the articulated lever 92 in case of an overload produced in this area by a stone, highly compacted deposits or the like, for example. Damage to the stripper device 84 can be prevented in this manner and/or optimal function can be achieved.

The invention claimed is:

1. A round baler comprising:
    a frame;
    a baling chamber;
    a pressing apparatus for forming a bale in the baling chamber;
    a tensioning lever pivotably mounted to the frame and interconnecting the frame and the pressing apparatus for maintaining a tension in the pressing apparatus;
    a tensioning arm coupled to the pressing apparatus and rotatably mounted to the frame for rotational movement relative to the frame in response to movement of the pressing apparatus by the tensioning lever;
    a stripper device including:
        a tensioning arm lever attached to the tensioning arm and rotatable with the tensioning arm;
        a bar carrier pivotably connected to and moveable relative to the frame between a first position and a second position;
        a scraping bar attached to and moveable with the bar carrier between the first position and the second position;
        wherein the scraping bar is abutted against the pressing apparatus when disposed in the first position for removing adhesions from the pressing apparatus;
        wherein the scraping bar is withdrawn from the pressing apparatus when disposed in the second position;
        an articulated lever attached to and rotatable with the bar carrier; and
        a connecting rod interconnecting the articulated lever and the tensioning arm lever, such that rotational movement of the tensioning arm moves the connecting rod, which in turn rotates the articulated lever to move the bar carrier between the first position and the second position.

2. The round baler of claim 1, wherein the pressing apparatus is constructed in the form of an endless pressing belt.

3. The round baler of claim 1, wherein the connecting rod includes a spring.

4. The round baler of claim 1, wherein at least a portion of the scraping bar is flexible and is in the form of a rubber strip or lip.

5. The round baler of claim 1, wherein the tensioning lever is provided to maintain a specifiable tension of the pressing apparatus during at least one of opening of the baling chamber and ejection of the bale.

6. The round baler of claim 1, wherein the stripper device is arranged in an area of the baling chamber facing a drawbar of the round baler, and cooperates with an outer side of the pressing apparatus.

* * * * *